(12) United States Patent
Vogt et al.

(10) Patent No.: US 9,069,059 B2
(45) Date of Patent: Jun. 30, 2015

(54) CONCEALED LIGHT DETECTION AND RANGING SYSTEM

(75) Inventors: Lionel D. Vogt, Kennesaw, GA (US); Kenneth E. Payne, Cullman, AL (US); Jarrod Fortinberry, Somerville, AL (US); Philip Farrish, Huntsville, AL (US)

(73) Assignee: LASER LIONS LLC, Cullman, AL (US)

( * ) Notice: Subject to any disclaimer, the term of this patent is extended or adjusted under 35 U.S.C. 154(b) by 407 days.

(21) Appl. No.: 13/443,712

(22) Filed: Apr. 10, 2012

(65) Prior Publication Data

US 2013/0265563 A1 Oct. 10, 2013

Related U.S. Application Data

(63) Continuation-in-part of application No. 12/779,918, filed on May 13, 2010, now abandoned.

(51) Int. Cl.
| | |
|---|---|
| *G01C 3/08* | (2006.01) |
| *G01S 7/48* | (2006.01) |
| *G01S 7/481* | (2006.01) |
| *G01S 7/495* | (2006.01) |

(52) U.S. Cl.
CPC ............. *G01S 7/4806* (2013.01); *G01S 7/4818* (2013.01); *G01S 7/495* (2013.01)

(58) Field of Classification Search
CPC ........ G01C 3/08; G01C 15/002; G01S 17/89; G01S 7/4817; G01S 17/42

USPC .......... 356/3.01, 4.01, 4.07, 5.01, 5.09, 9, 625
See application file for complete search history.

(56) References Cited

U.S. PATENT DOCUMENTS

| | | | | |
|---|---|---|---|---|
| 3,760,127 | A | * | 9/1973 | Camiciottoli et al. ........ 370/246 |
| 5,121,401 | A | * | 6/1992 | Dahl ........................... 372/38.03 |
| 5,317,148 | A | * | 5/1994 | Gray et al. ................ 250/227.26 |
| 6,412,987 | B1 | * | 7/2002 | Horwitz et al. .................. 385/56 |
| 6,429,768 | B1 | * | 8/2002 | Flick ............................... 340/5.2 |
| 7,099,533 | B1 | * | 8/2006 | Chenard ........................... 385/31 |
| 2010/0165322 | A1 | * | 7/2010 | Kane et al. .................... 356/4.01 |
| 2010/0226495 | A1 | * | 9/2010 | Kelly et al. ...................... 380/30 |

* cited by examiner

*Primary Examiner* — Isam Alsomiri
*Assistant Examiner* — Samantha K Abraham
(74) *Attorney, Agent, or Firm* — Crose Law LLC; Bradley D. Crose

(57) ABSTRACT

A concealed light detection and ranging system (LIDAR) for detecting, confusing, and jamming external laser, radar, infrared and other varieties of velocity and position detectors. The LIDAR mounts in numerous different locations on a vehicle such as the brake light, grill, door handle, etc. By utilizing a plethora of locations on the vehicle to receive and transmit light signals, the LIDAR allows generated light pulses to be carried by a network of fiber optic cables to the front, rear, top and sides of the vehicle. This ubiquitous positioning of the LIDAR on the vehicle allows for efficient reception and emission of light pulses to detect and/or, jam LIDAR guns, parking sensors, and proximity sensors without the need for the electronics to be exposed or mounted in the actual reception and transmission locations. When configured to detect lasers, the LIDAR further may include a laser receiver and pulse shaping device.

18 Claims, 10 Drawing Sheets

CONCEALED LIGHT DETECTION AND RANGING SYSTEM

CROSS-REFERENCE TO RELATED APPLICATIONS

The present Utility patent application is a continuation-in-part and claims priority benefit of the U.S. Utility patent application Ser. No. 12/779,918 and entitled "Concealed Light Detection and Ranging System", filed on May 13, 2010 now abandoned under 35 USC 111(a). The contents of this related utility patent application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to Light Detection and Ranging (LIDAR) systems. More particularly, one or more embodiments of the invention relate to LIDAR repeaters.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that known light detection and ranging systems (LIDAR), laser detection, LIDAR detection, LIDAR gun jammers, parking sensors, proximity sensors, and the like have common limitations and deficiencies. They are each tied to a system of receiving and transmitting light pulses through a box that must be clear of all obstructions. Unfortunately, this limitation means that the hardware is easily seen and difficult to mount without damaging the vehicle in which such a device is mounted. By way of example, cutting holes in grilles, bumpers, and body panels is often required in order to mount such a device. This further makes implementation of a discreet installation difficult. Additionally, known systems often have bulky hardware mounted in open view. Also, this open-view mount places sensitive electronics in harm's way for road debris, water intrusion, and the like. Further, the optics in such systems cannot be changed or custom designed for optimal use for a specific vehicle and specific applications.

By way of educational background, another aspect of the prior art generally useful to be aware of is that typically LIDAR jammers have limited mounting options due to their large size. Often, this causes LIDAR jammers to be displayed in an automobile in plain sight. Other structures in the automobile may also have to be altered to accommodate an area for the LIDAR jammer.

By way of educational background, another aspect of the prior art generally useful to be aware of is that typical LIDAR jammers also may have a limited number of sensors. This may cause the LIDAR jammer to fail to detect an enforcement device. Further, typical LIDAR jammers may have limited options as to where in an automobile a sensor may be placed.

By way of educational background, LIDAR provides an optical sensing technology which measures scattered light properties to determine speed information and/or range of a distant target. By measuring the time delay between transmission of a pulse of light and detection of the reflected signal the range to an object is determined. The speed of an object is determined by computing the difference in time delays between two or more successive pulses.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
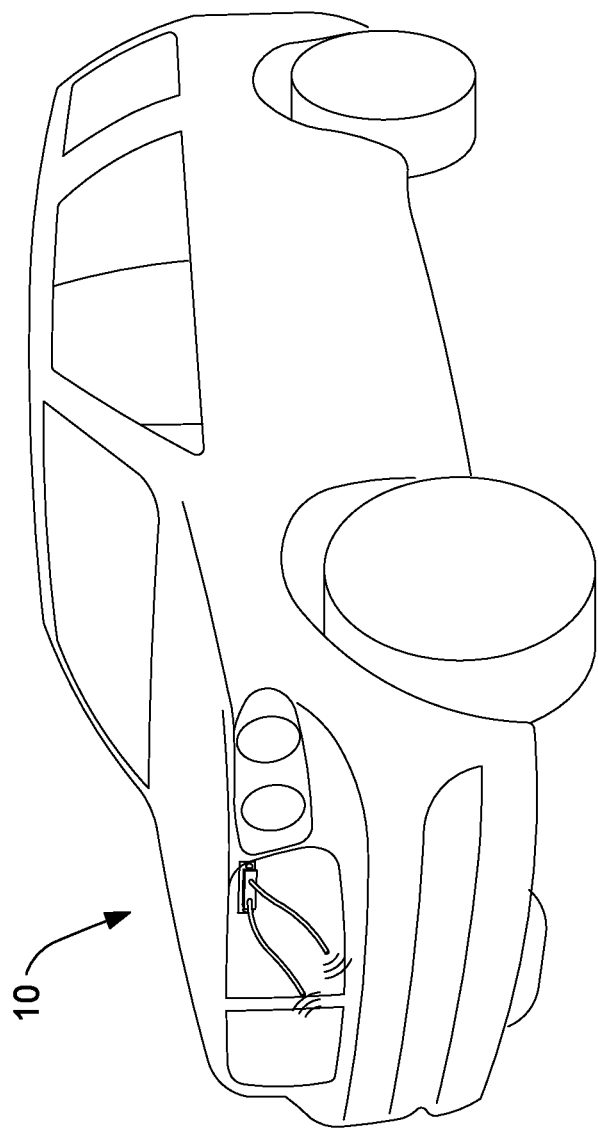
FIG. 1 is a front perspective view of a fiber optic LIDAR system, illustrating, in particular, a discreet mounting within a vehicle, in accordance with an embodiment of the present invention in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Before describing the disclosed embodiments of this technology in detail, it is to be understood that the technology is not limited in its application to the details of the particular arrangement shown here since the technology described is capable of other Embodiments. Also, the terminology used herein is for the purpose of description and not of limitation.

At least some of the exemplary embodiments described herein provide a system and associated methods for a fiber optic LIDAR for use with parking sensors, proximity sensors, traffic sensors, and the like.

An embodiment of the present invention, described in some detail below, provides a fiber optic LIDAR laser reception and transmission system for use with parking and proximity sensors and other known devices which detect, jam, misdirect or confuse traffic enforcement and traffic monitoring LIDAR devices.

A proximity sensor is a device that may be used in vehicles to help the driver or an autonomous cruise control system (ACC) determine the distance to objects. Additionally, the proximity sensor can alert the driver or ACC system to unseen objects.

A parking sensor is a proximity sensor configured to aid a driver to determine distance to objects. Additionally a parking sensor can alert a driver to unseen objects while the vehicle is parked.

A LIDAR gun is a device which uses LIDAR to determine speed and/or range. LIDAR guns are used by law enforcement, police, traffic enforcement and traffic monitoring agencies companies and services.

The term jam in this disclosure refers to interference with a LIDAR gun. To jam is to interfere with, confuse, overwhelm, misdirect or cause a false distance and/or speed reading calculation of a LIDAR gun.

The term jammer in this disclosure refers to a light reflection, light output device or circuit which jams a LIDAR gun.

Referring now to the Figures, a fiber optic cable assembly, a light detection and ranging system, and a method for using a light detection and ranging system with a reduced size for mounting hardware are illustrated.

A fiber optic concealed light detection and ranging and cable assembly 10 is shown. The fiber optic LIDAR and cable assembly 10 is configured for coupling to a light detection and ranging system. As depicted in FIG. 1, the fiber optic LIDAR and cable assembly 10 is shown in a discreet mounting within a vehicle.

The fiber optic LIDAR and cable assembly 10 is utilized for the reception and transmission of light pulses. This enables light pulses to travel to the sensing circuit assembly of a LIDAR detector, LIDAR gun jammer, laser detector, proximity sensor or parking sensor. This enables light pulses to be transmitted from the output circuit assembly of a LIDAR gun jammer, parking sensor, or proximity sensor through the fiber cable, fiber optic cable bundle solid optical cable. Such use enables detecting use of a LIDAR gun, determining distance to objects from a vehicle, and determining speed of objects relative to the speed of a vehicle, and jamming a LIDAR gun. In the present embodiment, proximity sensors which utilize visible, ultraviolet or infrared light are supported, rather than radar, ultrasonic sound or other methods.

Figure 2:
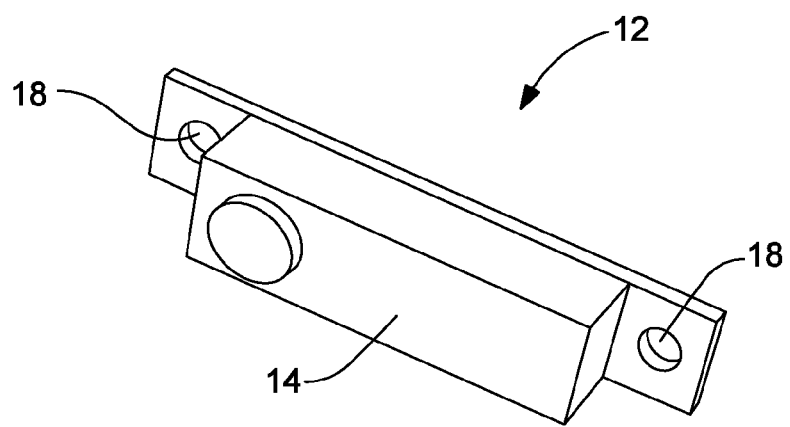
FIG. 2 is a front perspective view of known prior art, illustrating, in particular, a standard jamming head that requires the face to be open and clear for operation, and that is large and difficult to mount.

Systems known in the background art utilize a standard jamming head in which the unit face must be open and clear of obstruction in order to operate correctly. As depicted specifically in FIG. 2, known prior art is depicted. A standard jamming head 12 is shown. The face 14 of the standard jamming head 12 must be open and clear of obstruction in order to operate correctly.

Figure 3:
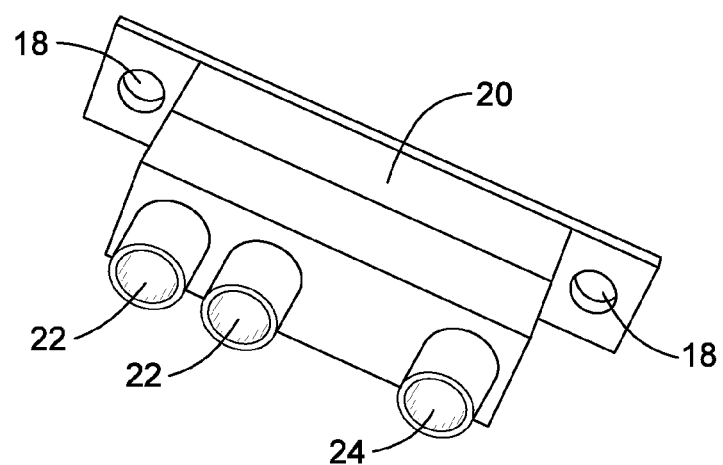
FIG. 3 is a front perspective view of a fiber optic LIDAR system, illustrating, in particular, a modified head configured with at least one fiber optic input jack and at least one fiber optic output jack, in accordance with an embodiment of the present invention in accordance with an embodiment of the present invention.

As depicted specifically in FIG. 3, the fiber optic LIDAR and cable assembly 10 jamming head 12 may operate as an adapter to housing 20. The jamming head 12 and housing 20 can be mounted in a variety of ways. Mounting apertures 18 are provided to enable x-axis and y-axis adjustments. The jamming head 12 can include mating connectors, or the like, for coupling to fiber optic cables. In at least one embodiment, the jamming head 12 is configured with at least one input port 22. In at least one embodiment, the jamming head 12 is configured with at least one output port 24. The input port 22 and the output port 24 are configured for coupling with a fiber optic cable.

The fiber optic LIDAR and cable assembly 10 includes at least one fiber optic cable configured to couple to a sensing circuit assembly of a concealed light detection and ranging system to allow, discreetly, light pulses to travel to and from the sensing circuit assembly.

Figure 4:
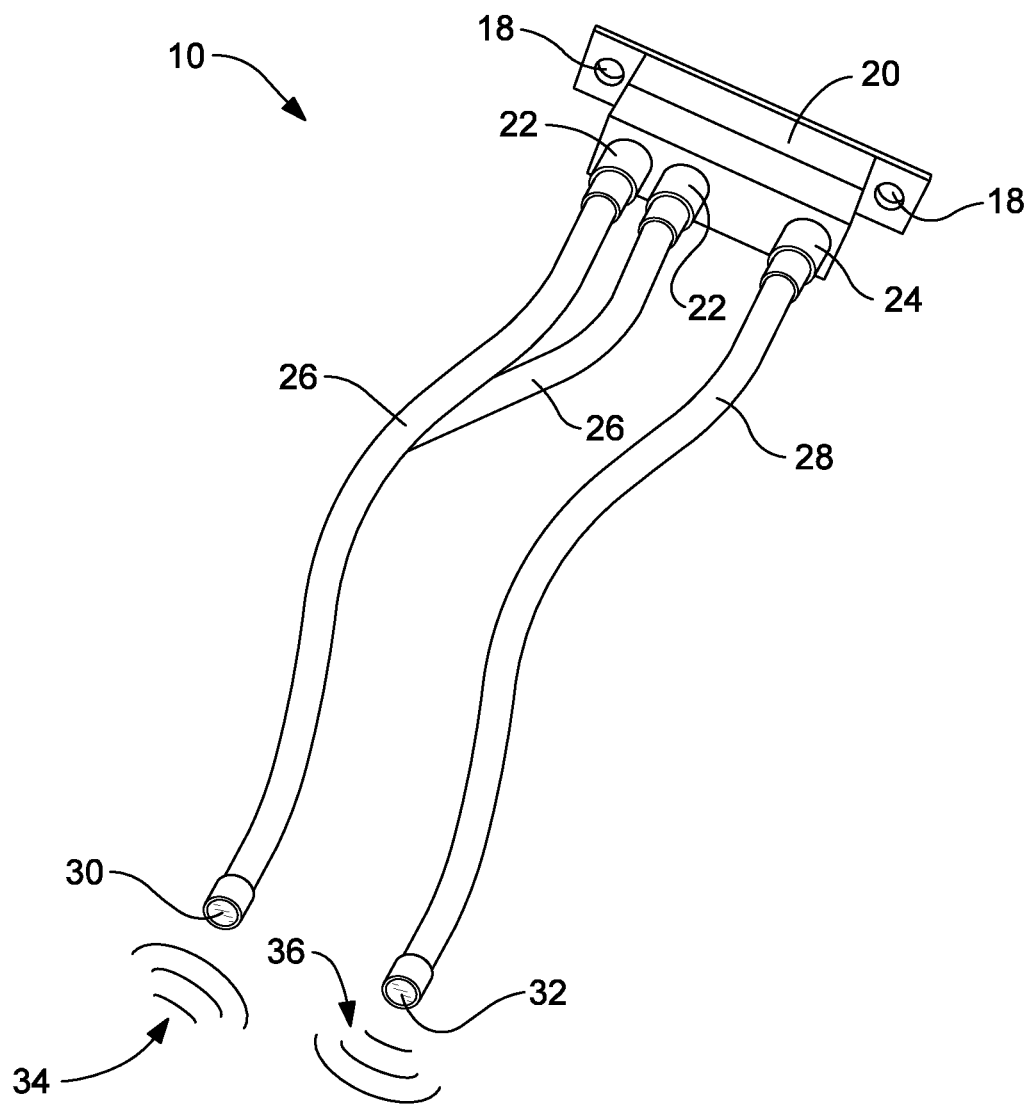
FIG. 4 is a front perspective view of a fiber optic LIDAR system, illustrating, in particular, input sensing fiber and the output fiber, in accordance with an embodiment of the present invention in accordance with an embodiment of the present invention.

As depicted specifically in FIG. 4, a pair of input sensing fibers 26 is coupled to input port 22. In one embodiment, the input port 22 may be a coupling input jack. Each input sensing cable 26 is fitted with an input sensing lens 30 to focus inward illumination 34 onto the distal end of the input sensing cable 26. By way of example, light pulses from a LIDAR gun or reflected light from the output of a proximity sensor or parking sensor gun strike the input sensing lens 30 lens of the input sensing cable 26 to then travel to at least one reception sensor in a LIDAR detector, LIDAR gun jammer, laser detector, parking sensor, or proximity sensor.

Also as depicted specifically in FIG. 4, an output cable 28 is coupled to output port 24. Each output fiber 24 is fitted with an output lens 32 at a distal end of the output fiber 24 to focus outward illumination 36 at the distal end of the output fiber 24 to direct light outwardly from the output cable 24.

Figure 5:
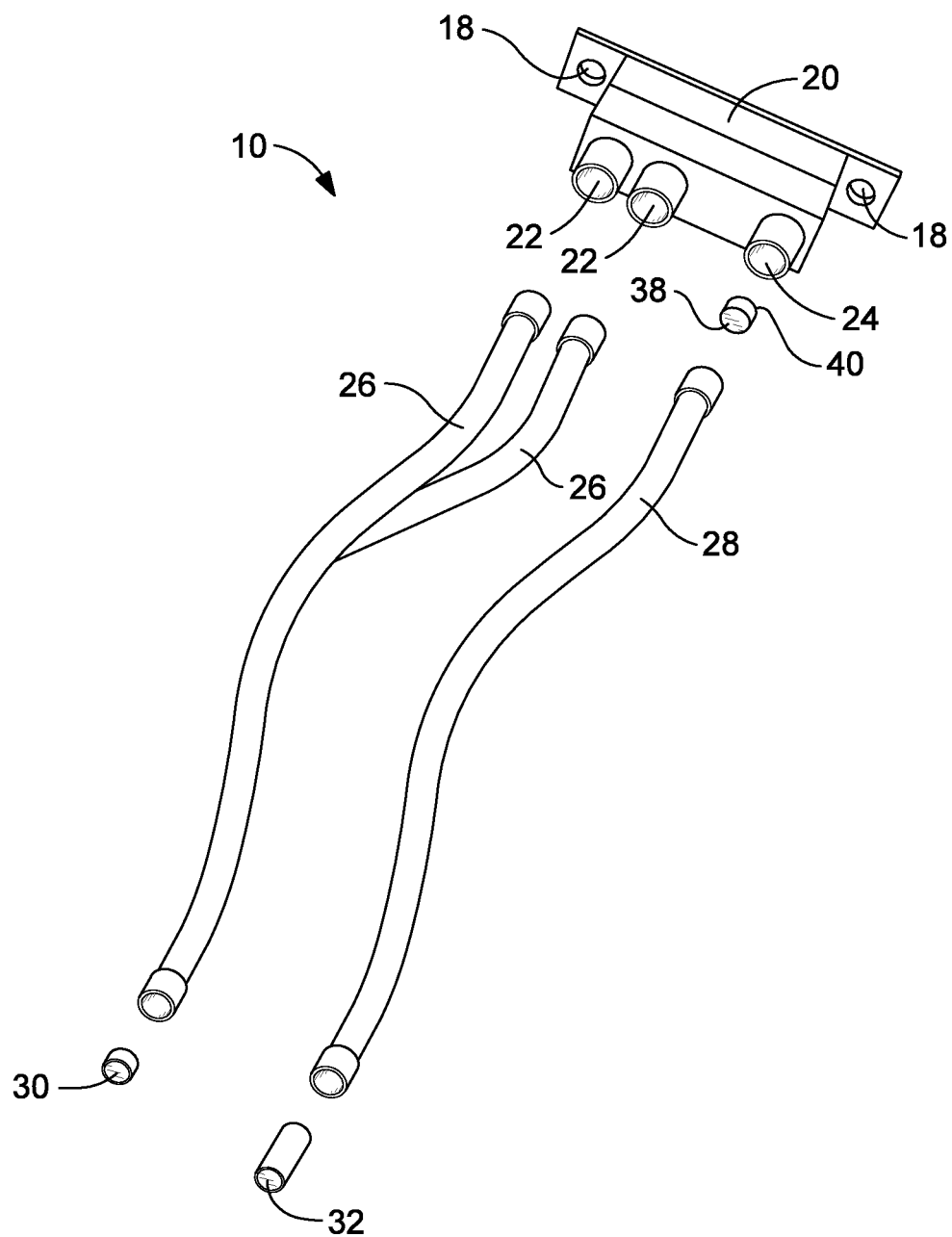
FIG. 5 is a expanded view of the fiber optic LIDAR system depicted in FIG. 4, illustrating, in particular, the input sensing lens, output lens, and collimating lens, in accordance with an embodiment of the present invention.

An alternate embodiment may include a collimating lens 38 at the proximal end of each output fiber 24 to optically align outward illumination 36 from fiber optic LIDAR and cable assembly 10. As depicted specifically in FIG. 5, the collimating lens 38 is shown in an expanded view of the fiber optic LIDAR and cable assembly 10. The mating connector 40 and collimating lens 38 can be integrally formed.

It is contemplated that since fiber optic LIDAR and cable assembly 10 transmits light in response to received light, and transmits light in order to determine speed or distance to objects, one embodiment may have an output light source connected to the collimation lens 38 fitted within housing 20. The collimation lens may be efficacious in focusing the light, and also supporting one end of output cable 28. The opposite end of the output cable 28 is mounted to the front, side, top, or back of a vehicle via a two-axis support and output lens 32. In one aspect of the present embodiment, materials having similar light pulse transmitting properties as fiber optics are largely used to transmit the light pulses throughout the fiber optic LIDAR and cable assembly 10.

In one embodiment, any fiber optic cable, whether the input sensing cable 26 or the output cable 28, can include multiple fibers. Alternatively, the fiber optic cable can be a solid core fiber.

The fiber optic LIDAR and cable assembly 10 may be manufactured and sold as an add-on product to an existing light detection and ranging device. Alternatively, the fiber optic LIDAR and cable assembly 10 may be manufactured and sold collectively with a light detection and ranging device system or jammer included.

In use, the technology described herein can be used to allow light pulses generated to be carried by the fiber optic cable to the front, rear, top and sides of the vehicle. This will allow for the reception light and emission of light needed to detect and/or, jam LIDAR guns and reception and transmission of light used by parking sensors and proximity sensors; without the need for the electronics to be exposed or mounted in the actual reception and transmission locations. Furthermore, it should be noted that output optics on the ends of fiber optic cables can be changed to incorporate several different light emission patterns and that light information from the transmitter or to the receiver can be split into several sections for mounting in several locations on the vehicle via the fiber optic cables.

Those skilled in the art, in light of the present teachings, will readily recognize that, at least for the present embodiment, to change models or brand names of the fiber optic LIDAR and cable assembly 10, the total assembly does not require removal and reinstallation. Rather, only the jamming head 12, proximity sensor, or range finder, need to be replaced and reattached to the fiber optic LIDAR and cable assembly 10.

Figure 6:
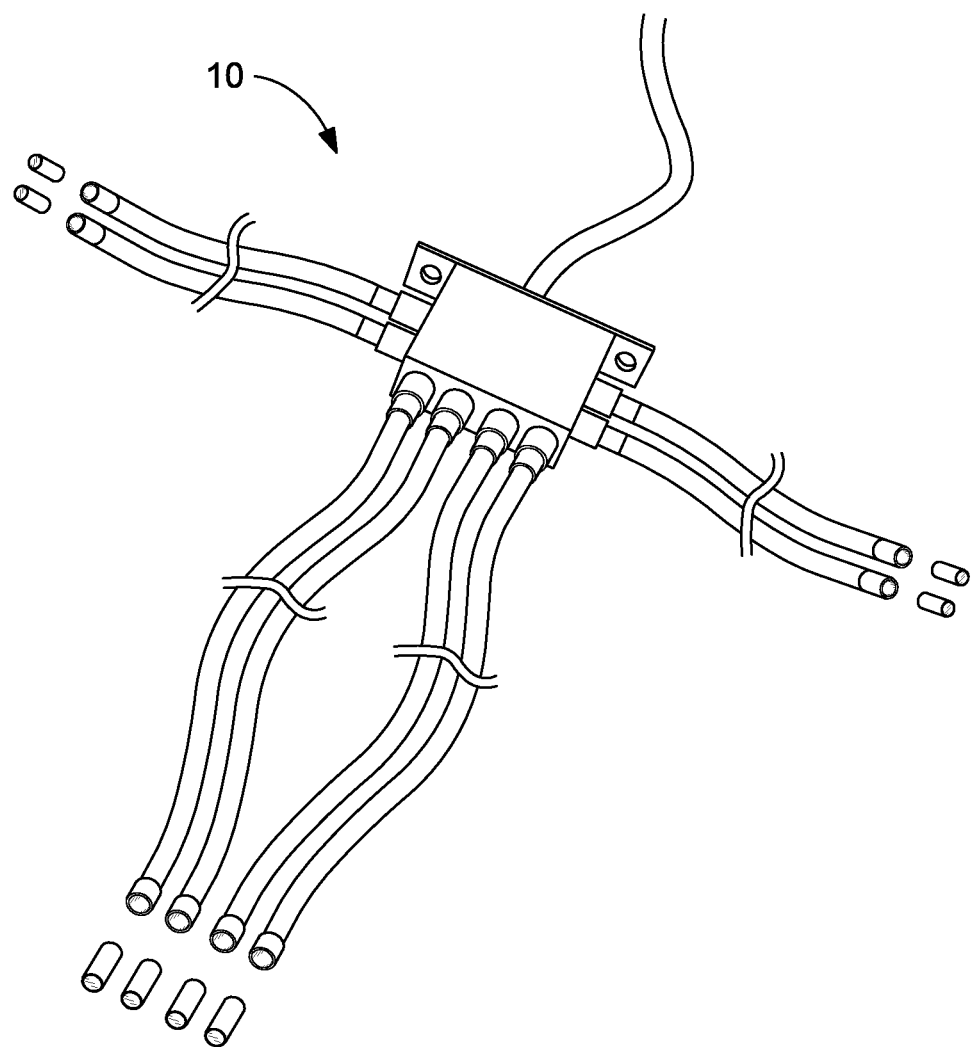
FIG. 6 is a front perspective view of a fiber optic LIDAR system, illustrating, in particular, multiple input sensing fibers and multiple output fibers, in accordance with an embodiment of the present invention.
Figure 7:
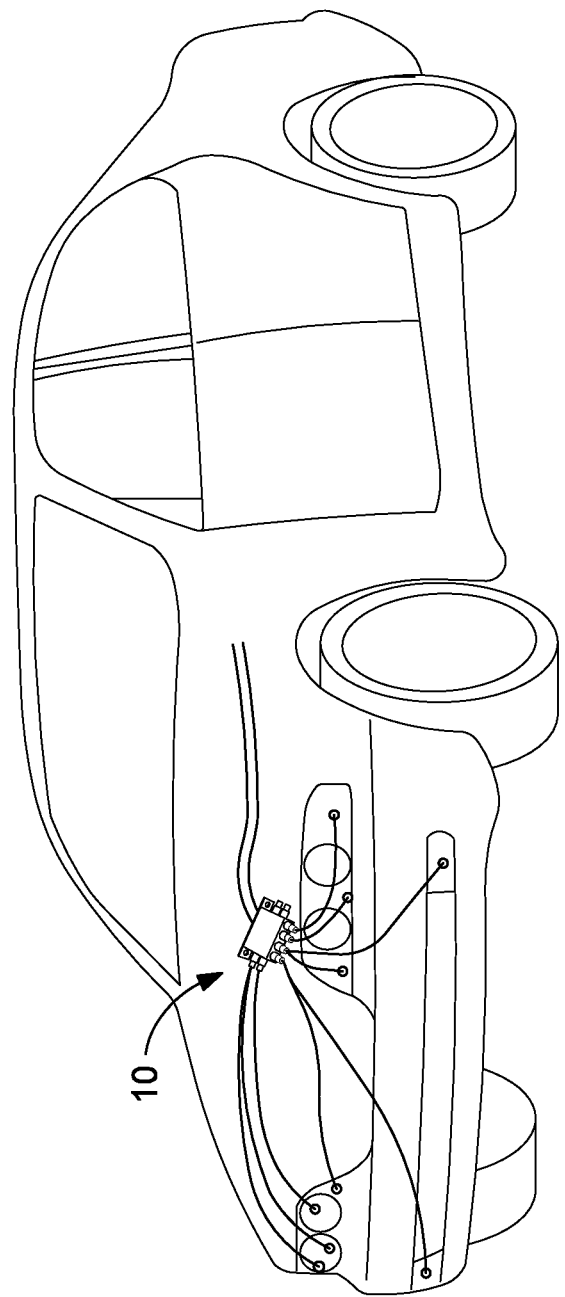
FIG. 7 is a view of the fiber optic LIDAR system depicted in FIG. 6, illustrating, in particular, the multiple input sensing fibers and multiple output fibers configured for use on the front of a vehicle, in accordance with an embodiment of the present invention.
Figure 8:
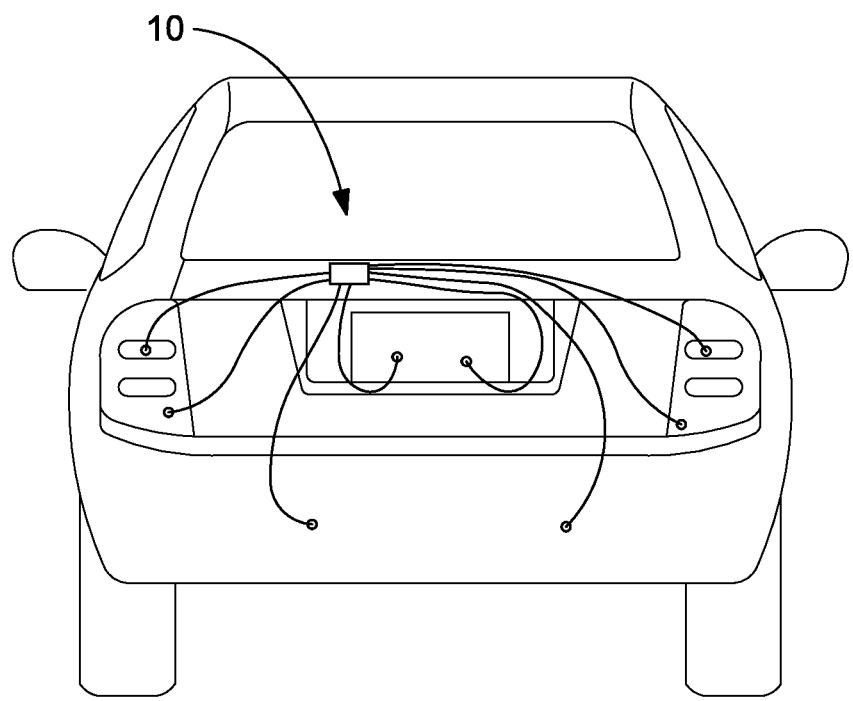
FIG. 8 is a view of the fiber optic LIDAR system depicted in FIG. 6, illustrating, in particular, the multiple input sensing fibers and multiple output fibers configured for use on the rear of a vehicle, in accordance with an embodiment of the present invention.

Additionally, in use, multiple fiber optic cables can be utilized. As depicted specifically in FIG. 6, a fiber optic LIDAR system is defined having multiple input sensing fibers and/or multiple output fibers. As depicted specifically in FIG. 7, the multiple input sensing fibers and/or multiple output fibers are configured for use on the front of a vehicle. As depicted specifically in FIG. 8, the multiple input sensing fibers and/or multiple output fibers are configured for use on the rear of a vehicle.

A method for using a light detection and ranging device system also is disclosed. The method can include one or more of the following steps: providing a light detection and ranging system having a sensing circuit assembly; providing a fiber optic cable assembly having at least one fiber optic cable configured to couple to the sensing circuit assembly of the light detection and ranging system to allow, discreetly, light pulses to travel to and from the sensing circuit assembly; a mounting head configured to couple the at least one fiber optic cable to the light detection and ranging system; and a mating connector disposed upon the mounting head and configured to couple the at least one fiber optic cable to the mounting head; concealing the light detection and ranging system in a vehicle wherein only a distal end of the fiber optic cable assembly is in line-of-sight with a second light detection and ranging system, sensor, detection unit, or the like; providing at least one input sensing fiber; providing an input sensing lens disposed upon a distal end of the input sensing fiber to focus light radiation onto the distal end of the input sensing fiber to travel to the sensing circuit assembly of the concealed light detection and ranging system; receiving an input light through the input sensing lens of the input sensing fiber to travel to the sensing circuit assembly of the concealed light detection and ranging system; providing at least one output fiber; providing an output lens disposed upon a distal end of the output fiber to focus light radiation at the distal end of the output fiber to direct light outwardly from the output fiber; transmitting a light output to the second light detection and ranging system, sensor, detection unit, or the like, thereby blocking any detection of presence, motion, speeding, or the like, of the vehicle in which the concealed light detection and ranging system and fiber optic cable assembly is mounted by the second light detection and ranging system, sensor, detection unit, or the like; providing a collimating lens disposed at a proximal end of the output fiber to optical align the light to depart from the concealed light detection and ranging system; and aligning, optically, the light to depart from the concealed light detection and ranging system.

Figure 9:
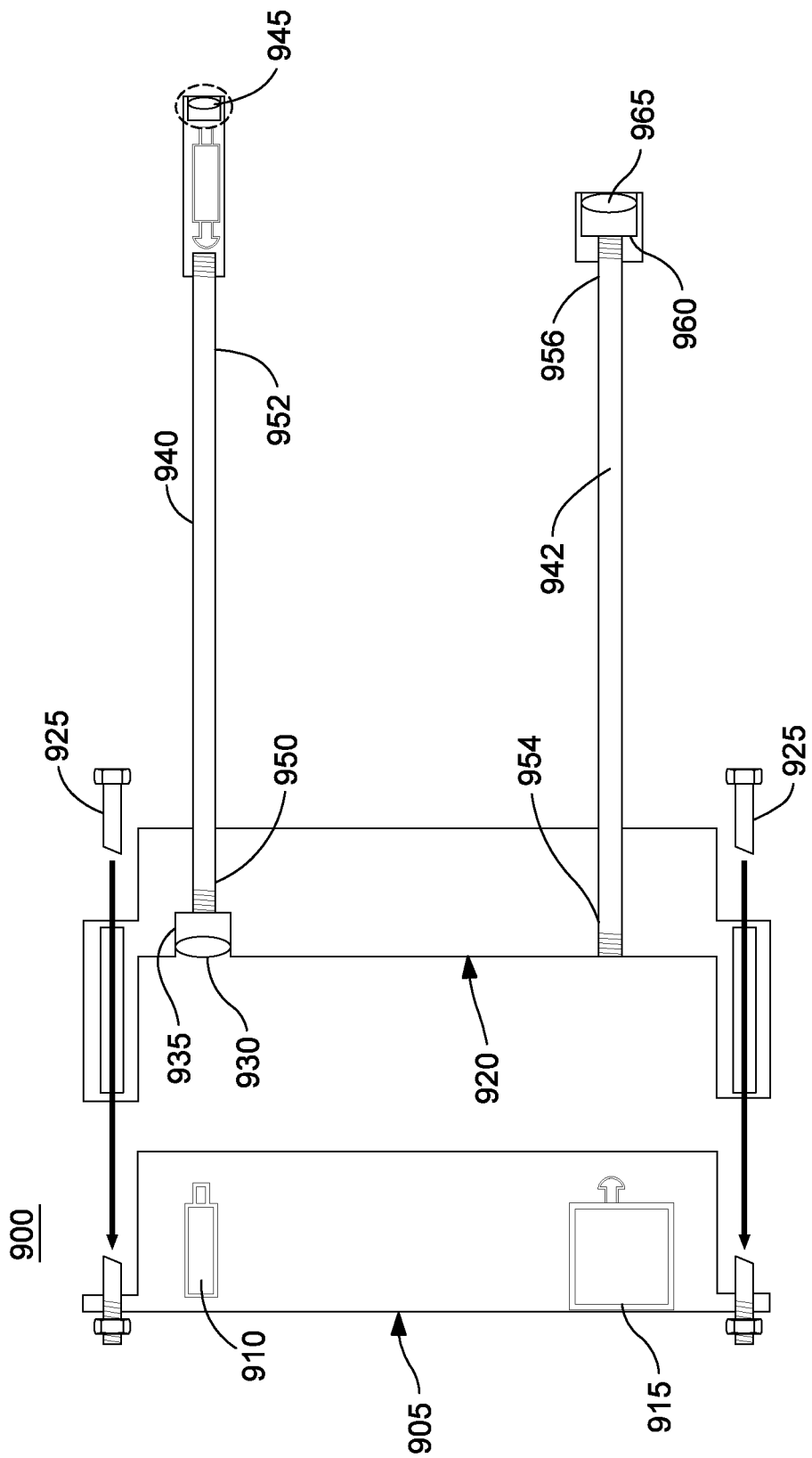
FIG. 9 illustrates an exemplary LIDAR repeater in accordance with an embodiment of the present invention.

FIG. 9 illustrates an exemplary LIDAR repeater 900 in accordance with an embodiment of the present invention. The LIDAR repeater includes or is coupled to a LIDAR jammer 905. The LIDAR jammer 905 may include a power source. The power source may include wattage. Suitable wattages include, but are not limited to one to five hundred watts. In some embodiments of the present invention, the LIDAR jammer 905 may include an illumination source 910. In one embodiment, illumination source 910 is infrared light. Other enabling features of the present invention for infrared light sources include, but are not limited to, a laser and a light emitting diode (LED), Thermal element, Gas laser, yag or crystal laser. In some embodiments, the LIDAR jammer 905 may also include an illumination receiver circuit 915. In at least some embodiments, the infrared receiver circuit 915 may include an infrared sensitive photo diode. In another embodiment, the infrared receiver circuit 915 may include a photo transistor. The infrared sensitive photo diode or the photo transistor may receive infrared light from the ambient environment in some embodiments.

In some embodiments, the LIDAR jammer 905 may be attached to a housing 920. Suitable materials for the housing include, but are not limited to, metal, aluminum, chromium, copper, iron, nickel, platinum, silver, titanium, plastic and rubber brass, wood, Bakelite, polycarbonate, ABS, Glass, Polystyrene, polyethylene, Acrylic, Foam rubber, Nylon, Kevlar, carbon fiber, fiberglass, Stone, RTV silicone rubber, Alumalite, epoxy and epoxy resin derivatives, and magnesium. The housing may be attached to the LIDAR jammer with an attachment mechanism 925 in some embodiments. Suitable attachment mechanisms include, but are not limited to, an adhesive, a screw, tape and a clamp, bolt and nut, hook and loop, Velcro™, Molex, or Snap lock.

In some embodiments of the present invention, a focusing lens 930 is provided. Suitable materials for the focusing lens include, but are not limited to, plastic, glass, polycarbonate plastic, Trivex, and acrylic. The focusing lens may include a diameter in some embodiments. Suitable diameters include, but are not limited to 2 mm to 4 cm. The focusing lens may be used to focus light emitted from the illumination light source 910. In one embodiment a niche 935 is provided in the housing 920, with the focusing lens 930 being disposed within the niche 935. This is efficacious in largely limiting the focusing lens' exposure to the elements.

In some embodiments of the present invention, the housing 920 includes an outward cable 940 and an inward cable 942. Suitable outward cables 940 and inward cables 942 include, but are not limited to, fiber optic, glass and plastic, Acrylic, polycarbonate, and PMMA. The outward cable 940 may be used to transmit infrared light from the illumination source 910 that is proximally located to an outward cable first section 950. An illumination repeater circuit 945 may be positioned at a distally located outward cable second section 952. In other embodiments, infrared light may be transferred from the illumination source 910 to the illumination repeater circuit 945 through the ambient environment.

In some embodiments, the inward cable 940 has an inward cable first section 954 and an inward cable second section 956. In one embodiment the inward cable first section 954 is joined to the housing 920. In some embodiments, the inward cable second section 956 includes a chamber 960. The chamber 960 may include an illumination gathering lens 965, in some embodiments. Suitable materials for the illumination gathering lens 965 include, but are not limited to, plastic, glass, and polycarbonate plastic, Trivex, and acrylic. Those skilled in the art can appreciate that the illumination gathering lens 965 may include varying lengths, depending on the type of illumination passing through the illumination gathering lens 965. Suitable lengths include, but are not limited to, 1 mm to 10 cm. The infrared light gathering lens 965 may gather infrared light from the ambient environment. In some embodiments, the illumination gathering lens 965 focuses infrared light through the inward cable 942 to the illumination receiver circuit 915.

In some embodiments the outward cable 940 may include at least one fiber optic Y-adapter. The fiber optic Y-adapter may transmit illuminations, not limited to infrared light, ultraviolet light, visible light, or laser energy from the illumination source 910 to a plurality of illumination repeater circuits 945. A suitable number of Y-adapters includes, but is not limited to one to sixteen per LIDAR jammer 905, with the greater number of Y-adapters providing increased reception and transmission of light.

Figure 10A:
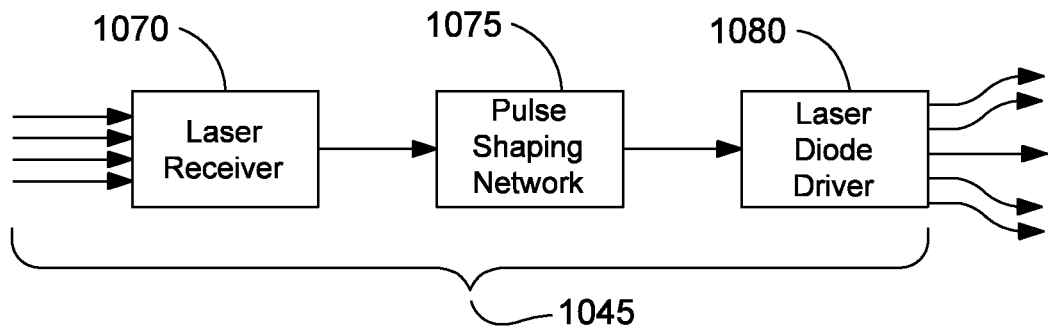
FIGS. 10A and 10B illustrate a block diagram of an exemplary LIDAR repeater in accordance with an embodiment of the present invention.
Figure 10B:
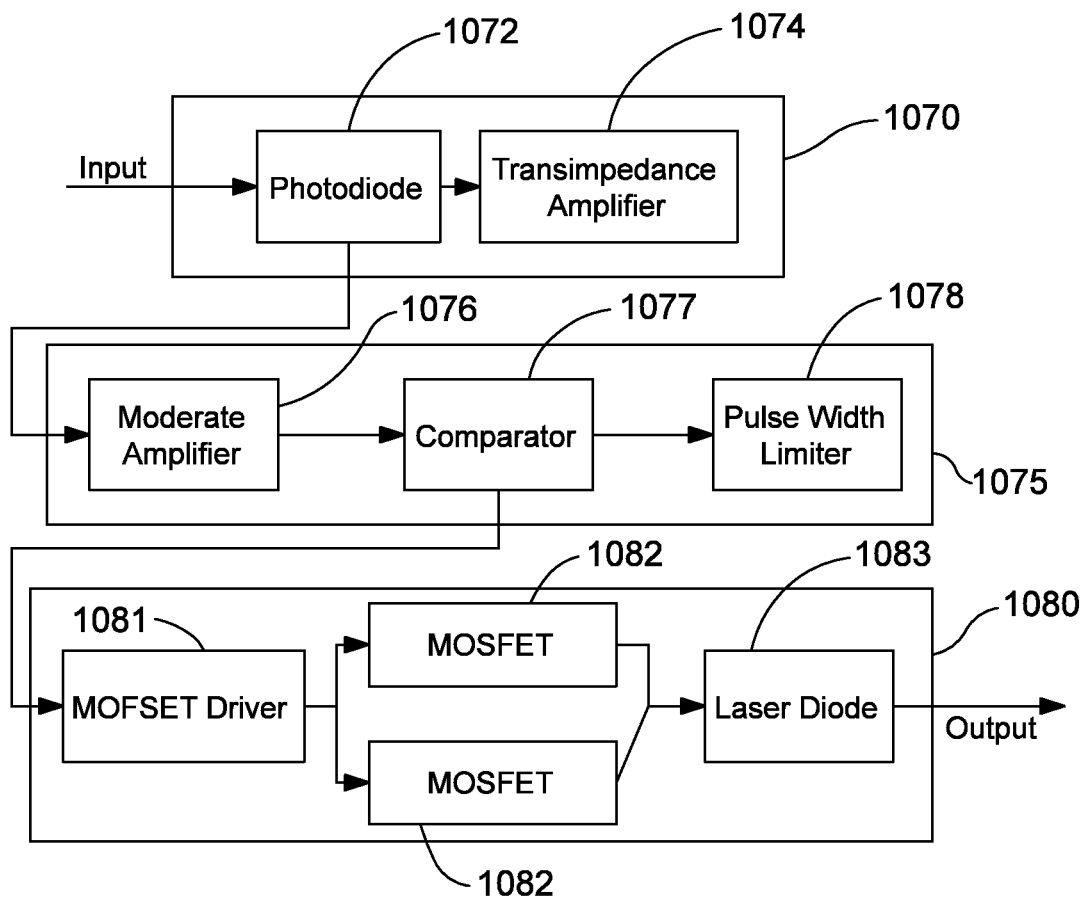

FIG. 10A and FIG. 10B illustrate a block diagram of an exemplary LIDAR repeater 900 in accordance with an embodiment of the present invention. In some embodiments of the present invention, the illumination repeater circuit 945 may include a laser receiver 1070, a pulse shaping network 1075, and a laser diode driver 1080. The laser receiver 1070, a pulse shaping network 1075, and a laser diode driver 1080 may be combined onto a single printed circuit board (PCB). In some embodiment, the PCB is powered using a power supply. Suitable power supplies include, but are not limited to, a regulated 12 volt DC power supply having a 11.5 to 13.5 volt direct current range. Power supply types include, but are not limited to DC regulator, DC to DC converter, AC to DC converter, constant current regulator, batteries, or any other power source now known or later developed.

In some embodiments, illumination is transmitted to the laser receiver 1070, to the pulse shaping network 1075, and to the laser diode driver 1080.

In some embodiments the laser receiver 1070, as illustrated by way of example FIG. 10B, may include at least one of a photo diode 1072 and a transimpedance amplifier 1074. The photo diode 1072 may produce a current from the light input. In some embodiments, the transimpedance amplifier 1074 converts the current to a voltage. The voltage may enter the pulse shaping network 1075. The pulse shaping network may be used to reproduce a pulse. In some embodiments, the pulse may have a pulse width. Suitable pulse widths include, but are not limited to 1 nanosecond to 100 nanoseconds. In some embodiments, the pulse shaping network 1075 may include at least one of a moderate gain amplifier 1076, a high speed comparator 1077, and a pulse width limiter 1078. The moderate gain amplifier 1076 may boost increase the voltage. Suitable voltages include, but are not limited to one to five volts. The high speed comparator 1077 may produces an output pulse. In some embodiments the, output pulse is capable of driving the laser diode driver. The pulse width limiter 1078 may include a pulse width limiter circuit 1079. In some embodiments, the pulse width limiter circuit 1079 regulates the output pulse. The pulse width limiter circuit 1079 may ensure that the pulse does exceed a maximum pulse width rating of the laser diode driver 1080. The laser diode driver 1080 may include at least one of a metal oxide semiconductor field-effect transistor (MOSFET) 1082, a MOSFET driver 1081, and a laser diode 1083. In some embodiments, at least two MOSFETs are provided. In one embodiment, the MOSFET driver 1081 is used in conjunction with two MOSFETs 1082 to drive the laser diode 1083 with the output pulse. The MOSFET driver coupled with the dual MOSFETs drives a pulse from the laser diode that is similar in characteristics to the initial pulse received by the LIDAR receiver portion of the repeater circuit. Those skilled in the art, in light of the present teachings, will readily recognize that the MOSFET driver is typically a LTC4442EMS8E#PBF-ND, and often, the MOSFETs are two IRF7821GTRPBFCT-ND parts. The Laser Diode is typically an OSRAM SPL PL90-3. The pin photo diode (receiver) may be a PNZ331CL.

In some embodiments, the LIDAR repeater 900 may be installed in small areas of the vehicle including, but not limited to between front or rear body panels and a bumper, between grill components, or inside of headlight and/or taillight assemblies, brake lights, grill, and door handle of a vehicle. It is contemplated that the LIDAR repeater 900 may also be installed in proximity to side view mirrors, inside the vehicle facing outward along the front and read headliner edge, top of dash, top of rear dash, under front or bumper, between headlights and bumper, inserted into existing OEM or aftermarket parking sensor housings, inserted into OEM or aftermarket backup camera housing. In other embodiments, points of installation may include license plate screw holes, license plate holder and supports, fog lights, turn signals, and rear window brake lights.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of LIDAR repeaters 900 according to the present invention will be apparent to those skilled in the art. The invention has been described above by way of illustration, and the specific embodiments disclosed are not intended to limit the invention to the particular forms disclosed. For example, the particular implementation of the LIDAR repeater 900 may vary depending upon the particular wavelength of light used. The LIDAR repeater 900 described in the foregoing were directed to infrared implementations; however, similar techniques and wavelengths including, but not limited to, ultraviolet, visible, and microwave are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A concealed light detection and ranging system, said concealed light detection and ranging system comprising:
 a jamming head for a concealed light detection and ranging system, said jamming head comprising a housing configured to be concealed in a vehicle out of line-of-sight with a second light detection and ranging system, sensor, or detection unit, said housing comprising a face operatively joined to said housing, said face comprising at least one input port, said at least one input port comprising at least one mating connector for coupling said at least one input port with at least one input sensing fiber optic cable, said at least one input sensing fiber optic cable comprising at least one input sensing lens, said input sensing lens being dislocated from the concealed housing but optically coupled to said jamming head remotely through said at least one input sensing fiber optic cable and operable for receiving an inward illumination, said face further comprising at least one output port, said at least one output port comprising said at least one mating connector for coupling said at least one output port with at least one output fiber optic cable, said at least one output fiber optic cable comprising at least one output lens dislocated from the concealed housing but optically coupled to said jamming head remotely through said at least one output fiber optic cable and, wherein the concealed light detection and ranging system is configured to be concealed in a vehicle wherein only a first distal end of the input sensing fiber optic cable and a second distal end of the output fiber optic cable is configured to be in line-of-sight with a second light detection and ranging system, sensor, or detection unit.

2. A concealed light detection and ranging system, said concealed light detection and ranging system comprising:
a jamming head for a concealed light detection and ranging system, said jamming head comprising a housing configured to be concealed in a vehicle out of line-of-sight with a second light detection and ranging system, sensor, or detection unit, said housing comprising a face operatively joined to said housing, said face comprising at least one input port, said at least one input port comprising at least one mating connector for coupling said at least one input port with at least one input sensing fiber optic cable, said at least one input sensing fiber optic cable comprising at least one input sensing lens, said input sensing lens being dislocated from the concealed housing but optically coupled to said jamming head remotely through said at least one input sensing fiber optic cable and operable for receiving an inward illumination, said face further comprising at least one output port, said at least one output port comprising said at least one mating connector for coupling said at least one output port with at least one output fiber optic cable, said at least one output fiber optic cable comprising at least one output lens dislocated from the concealed housing but optically coupled to said jamming head remotely through said at least one output fiber optic cable and, said at least one output fiber optic cable further comprising at least one collimating lens, said at least one collimating lens being configured to focus said outward illumination; and wherein the concealed light detection and ranging system is configured to be concealed in a vehicle wherein only a first distal end of the input sensing fiber optic cable and a second distal end of the output fiber optic cable is configured to be in line-of-sight with a second light detection and ranging system, sensor, or detection unit.

3. The concealed light detection and ranging system of claim 2, wherein said inward illumination is infrared light.

4. The concealed light detection and ranging system of claim 3, wherein said outward illumination is infrared light.

5. The concealed light detection and ranging system of claim 4, in which said concealed light detection and ranging system further comprises a light detection and ranging repeater for providing a multiplicity of said inward illumination and said outward illumination, said a light detection and ranging repeater comprising a light detection and ranging repeater jammer, said light detection and ranging repeater jammer comprising at least one illumination source, said light detection and ranging jammer further comprising an illumination receiver circuit, said light detection and ranging repeater further comprising a housing operatively joined to said light detection and ranging jammer, said housing comprising at least one attachment mechanism for mating said housing with an outward cable and an inward cable, said outward cable comprising an outward cable first section proximally located to said housing, said outward cable first section comprising a niche, said niche being disposed to receive a focusing lens, said focusing lens configured to guide said outward illumination, said outward cable further comprising an outward cable second section distally located to said housing, said outward cable second section comprising an illumination repeater circuit, said inward cable comprising an inward cable first section proximally located to said housing, said inward cable further comprising an inward cable second section distally located to said housing, said inward cable second section joined to a chamber, said chamber being disposed to receive an illumination gathering lens, said illumination gathering lens being configured to guide said inward illumination towards said illumination receiver circuit.

6. The concealed light detection and ranging system of claim 5, in which said illumination repeater circuit further comprises a laser receiver, said laser receiver comprising a photo diode, said photo diode being operable to convert said inward illumination to an electrical current, said photo diode operatively joined to a transimpedance amplifier, said transimpedance amplifier being operable to convert said electrical current to a voltage, said transimpedance amplifier operatively joined to a pulse shaping network, said pulse shaping network being operable to convert said voltage to a pulse signal, said pulse shaping network comprising a moderate gain amplifier, said moderate gain amplifier being operable to amplify said voltage entering said pulse shaping network, said pulse shaping network further comprising a high speed comparator, said high speed comparator being operable to produce a pulse signal, said pulse shaping network further comprising a pulse width limiter, said pulse width limiter further comprising a pulse width limiter circuit, said illumination repeater circuit further comprising a laser diode driver, said laser diode driver comprising a laser diode, said laser diode driver further comprising a metal oxide semiconductor field-effect transistor, said laser diode driver further comprising a metal oxide semiconductor field-effect transistor driver.

7. The concealed light detection and ranging system of claim 6, in which said light detection and ranging repeater further comprises a multiplicity of Y-adapters, said multiplicity of Y-adapters being disposed to amplify the reception of said inward illumination and the transmission of said outward illumination from said light detection and ranging repeater.

8. The concealed light detection and ranging system of claim 5, in which said concealed light detection and ranging system further comprises a laser receiver.

9. The concealed light detection and ranging system of claim 2, wherein said inward illumination is visible light.

10. The concealed light detection and ranging system of claim 9, wherein said outward illumination is visible light.

11. The concealed light detection and ranging system of claim 2, wherein said inward illumination is ultraviolet light.

12. The concealed light detection and ranging system of claim 11, wherein said outward illumination is ultraviolet light.

13. The jamming head of claim 12 in which said jamming head further comprises a housing, said housing comprising a face operatively joined to said housing, said face comprising at least one input port, said at least one input port comprising at least one mating connector for coupling said at least one input port with at least one input sensing cable, said at least one input sensing cable comprising at least one input sensing lens, said input sensing lens being operable for receiving an inward illumination, said face further comprising at least one output port, said at least one output port comprising said at least one mating connector for coupling said at least one output port with at least one output cable, said at least one output cable comprising at least one output lens, said at least one output cable further comprising at least one collimating lens, said at least one collimating lens being configured to focus said outward illumination.

14. The concealed light detection and ranging system of claim 2, wherein said inward illumination is a laser.

15. The concealed light detection and ranging system of claim 14, wherein said outward illumination is a laser.

16. The concealed light detection and ranging system of claim 15, wherein said outward illumination is a laser.

17. The concealed light detection and ranging system of claim 14, wherein said inward illumination is a laser.

18. A concealed light detection and ranging system comprising:
- a jamming head means for a concealed light detection and ranging system for receiving an inward illumination and transmitting an outward illumination;
- means for transmitting said outward illumination comprising at least one output fiber optic cable and one output lens, dislocated from the jamming head but optically coupled to said jamming head remotely through said at least one output fiber optic cable;
- means for detecting said inward illumination comprising at least one input sensing fiber optic cable and one input sensing lens, dislocated from the jamming head but optically coupled to said jamming head remotely through said at least one input sensing fiber optic cable; and
- means for obstructing said inward illumination;
- wherein the jamming head means, means for transmitting said outward illumination, means for detecting said inward illumination; and means for obstructing said inward illumination collectively comprise the concealed light detection and ranging system;
- means for concealing the concealed light detection and ranging system;
- wherein the concealed light detection and ranging system is configured to be concealed in a vehicle wherein only a first distal end of the input sensing fiber optic cable and a second distal end of the output fiber optic cable is configured to be in line-of-sight with a second light detection and ranging system, sensor, or detection unit.

* * * * *